(12) United States Patent
Rao et al.

(10) Patent No.: US 12,457,210 B2
(45) Date of Patent: Oct. 28, 2025

(54) REMOTE TRANSACTION VERIFICATION

(71) Applicant: Visa International Service Association, San Francisco, CA (US)

(72) Inventors: Sindhu Shankar Rao, Bengaluru (IN); Vaibhav Shukla, Mumbai (IN)

(73) Assignee: Visa International Service Association, San Francisco, CA (US)

( * ) Notice: Subject to any disclaimer, the term of this patent is extended or adjusted under 35 U.S.C. 154(b) by 511 days.

(21) Appl. No.: 17/945,852

(22) Filed: Sep. 15, 2022

(65) Prior Publication Data

US 2024/0098085 A1 Mar. 21, 2024

(51) Int. Cl.
*G06F 21/00* (2013.01)
*H04L 9/40* (2022.01)

(52) U.S. Cl.
CPC ........ *H04L 63/0876* (2013.01); *H04L 63/123* (2013.01)

(58) Field of Classification Search
CPC .... H04L 63/0876; H04L 63/123; H04L 63/08
See application file for complete search history.

(56) References Cited

U.S. PATENT DOCUMENTS

| | | | |
|---|---|---|---|
| 7,516,882 B2 | 4/2009 | Cucinotta | |
| 9,805,370 B1 | 10/2017 | Quigley et al. | |
| 2009/0288164 A1 * | 11/2009 | Adelstein | H04L 63/123 726/22 |
| 2019/0238567 A1 * | 8/2019 | Sharma | H04L 63/1416 |
| 2020/0228520 A1 * | 7/2020 | Thampi | H04L 9/3271 |
| 2021/0092136 A1 * | 3/2021 | Woodworth | H04L 63/1416 |

FOREIGN PATENT DOCUMENTS

EP 0866591 A1 * 9/1998

* cited by examiner

*Primary Examiner* — Kendall Dolly
(74) *Attorney, Agent, or Firm* — Kilpatrick Townsend & Stockton LLP

(57) ABSTRACT

A method includes a host computer creating a log file containing data used to determine if the host computer is being controlled by a viewer computer. The host computer transmits an interaction request message comprising the log file to an authentication server computer. The authentication server computer determines if an interaction associated with the interaction request message is authentic or not authentic.

20 Claims, 4 Drawing Sheets

REMOTE TRANSACTION VERIFICATION

BACKGROUND

Digital identity theft is a concern. Device fingerprinting and behavioral profiling are current methods for gauging the legitimacy of a person or device that is utilizing a device.

However, with the increase in remote access that allows one computer to remotely access another computer using remote access software, it has become easier for a malicious entity to perform malicious interactions. For example, an unauthorized user may trick a target user to download remote monitoring software (e.g., disguised as some other type of software) onto the target user's computer, and may further disguise a prompt on a target user's computer to allow the unauthorized user's computer to access the target user's computer. The target user may be tricked into accepting the prompt and may unknowingly allow the unauthorized user to access the target user's computer. The unauthorized user could then conceivably access secure credentials (e.g., account numbers, passwords, etc.) on the target user's computer, and may use them when the target user's computer is on but the target user is not currently using their computer. The unauthorized user can then pretend to be the target user and may perform unauthorized interactions such as accessing secure data or conducting payment transactions.

Embodiments of the disclosure address this problem and other problems individually and collectively.

SUMMARY

One embodiment is related to a method comprising: creating, by a host computer, a log file containing data used to determine if the host computer is being controlled by a viewer computer; and transmitting, by the host computer, an interaction request message comprising the log file to an authentication server computer, wherein the authentication server computer determines if an interaction associated with the interaction request message is authentic or not authentic.

Another embodiment is related to a host computer comprising: a processor; and a computer-readable medium coupled to the processor, the computer-readable medium comprising code executable by the processor for implementing a method comprising: creating a log file containing data used to determine if the host computer is being controlled by a viewer computer; and transmitting an interaction request message comprising the log file to an authentication server computer, wherein the authentication server computer determines if an interaction associated with the interaction request message is authentic or not authentic.

Another embodiment is related to a method comprising: receiving, by an authentication server computer from a host computer, an interaction request message comprising a log file containing data used to determine if the host computer is being controlled by a viewer computer; and determining, by the authentication server computer, if an interaction associated with the interaction request message is authentic or not authentic based on the data in the log file.

Another embodiment includes an authentication server computer comprising: a processor; and a computer readable medium, the computer readable medium comprising code, executable by the processor, for implementing a method comprising: receiving, by an authentication server computer from a host computer, an interaction request message comprising a log file containing data used to determine if the host computer is being controlled by a viewer computer; and determining, by the authentication server computer, if an interaction associated with the interaction request message is authentic or not authentic based on the data in the log file.

Further details regarding embodiments of the disclosure can be found in the Detailed Description and the Figures.

DETAILED DESCRIPTION

Figure 1:
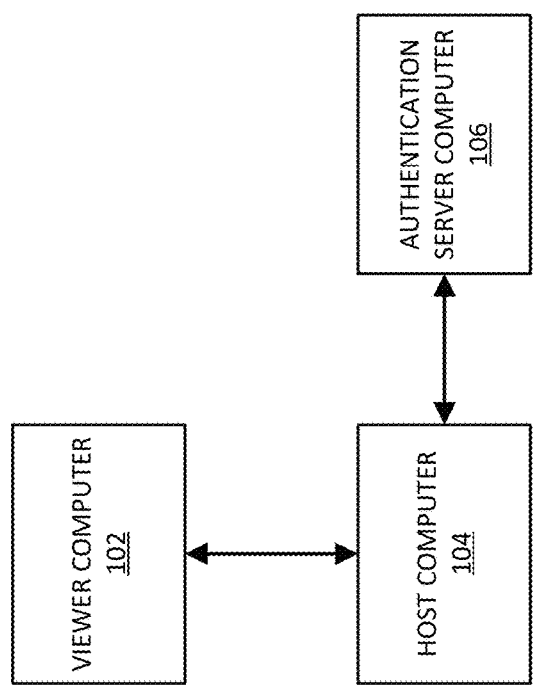
FIG. 1 shows a block diagram of a remote interaction verification system according to embodiments.

Prior to discussing embodiments of the disclosure, some terms can be described in further detail.

A "host computer" can serve as a host to another client computer. In some cases, a host computer can include software and/or hardware that allows the host computer to be accessed by a viewer computer. When a host computer is accessed by a viewer computer, the viewer computer can control the actions of the host computer through control commands.

A "viewer computer" can include a computer that accesses a host computer. A viewer computer can remotely access and control a host computer.

A "log file" can include a collection of data that contains information about a computer. A log file can include data of usage patterns, activities, and operations within an operating system of the computer, information about applications or their operation on the computer, information about the devices that may be in communication with or connected to the computer, etc. In embodiments, a log file can contain data used to determine if a host computer is being controlled by a viewer computer. The data used to determine if the host computer is being controlled by the viewer computer can include permissions data, input device data, operating system data, and/or communication channel data.

"Input device data" can include data obtained from a computer peripheral. Input device data can include keyboard data, mouse data, touchscreen data, etc.

A "control command" can include an instruction or signal that causes a computer to perform one or more functions. In some cases, a control command can include instructions or signals send from a viewer computer for a host computer to execute. In some instances, a control command can include mouse clicks on user interface buttons, keyboard entries, mouse movements, and other commands that the viewer computer can send to the host computer to control the host computer.

A "plug-in" can include software that extends the capabilities of a program. In some cases, a plug-in can include software additions that allow for the customization of computer programs, applications, and web browsers. For example, a plug-in can provide additional functionality to a web browser. A plug-in can be an authentication plug-in.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

The term "verification" and its derivatives may include a process that utilizes information to determine whether an underlying subject is valid under a given set of circumstances. Verification may include any comparison of information to ensure some data or information is correct, valid, accurate, legitimate, and/or in good standing.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments of the disclosure provide a solution to identify and extract details of a host computer and a viewer computer that is remotely accessing the host computer while an interaction is being conducted using the host computer.

Host computers can grant access to viewer computers that allow the viewer computers to access and control the host computers. A malicious entity that operates a viewer computer can be granted access to the host accidently or through malicious actions. For example, the malicious entity can be granted remote access permissions by the host computer by using faked or forged information, providing legitimate services while also performing malicious actions, or otherwise tricking a user of the host computer to grant access.

Currently, if an interaction is initiated by the viewer of the viewer computer using the host computer remotely, there is no way for an authentication server computer to determine if the host computer is being controlled by a viewer computer. Only the data of the host computer can be obtained by the authentication server computer, while any data regarding the viewer computer cannot be obtained. There is no current way for an authentication server computer to map the interaction to the viewer computer. In the case of identity theft, the viewer computer cannot be traced at all by the authentication server computer.

To solve this technical problem, embodiments provide for a technical solution which can allow an authentication server computer to obtain the details of the viewer computer along with the host computer as the viewer computer is in communication with the host computer. The host computer (e.g., via an authentication plug-in installed thereon), can allow the authentication server computer to obtain the details of the viewer computer. For example, embodiments provide for an authentication plug-in (e.g., remote access monitoring software) which can be installed on the host computer. The host computer can update the plug-in with data relating to the viewer computer. Whenever an interaction is performed by the host computer, the plug-in updates, or otherwise provides, the authentication server computer with data relating to the viewer computer(s) in communication with the host computer, including those which initiated the interactions via the host computer. The host computer will have information regarding which systems (e.g., a viewer computer) are connected to the host computer and the configurations of the connected systems. These configurations are updated and communicated to the plug-in, which would eventually send all the relevant information to the authentication server computer when needed, or can be sent directly to the authentication server computer. If the presence of a viewer computer is detected after communicating with the host computer, then the authentication server computer could perform further authentication processes (e.g., a two factor authentication process) or it could indicate that the interaction is declined.

Thus, the authentication server computer can obtain data relating to the viewer computer along with the data relating to the host computer. In this way, embodiments of the invention can track and map an interaction flow that originated from the viewer computer that is remotely accessing the host computer.

FIG. 1 shows a system 100 according to embodiments of the disclosure. The system 100 comprises a viewer computer 102, a host computer 104, and an authentication server computer 106. The viewer computer 102 can be in operative communication with the host computer 104, which can be in operative communication with the authentication server computer 106.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between the devices included in the system 100 of FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The viewer computer 102 can include a device that can access, view, and control the operations of the host computer 104. For example, the viewer computer 102 can include a desktop computer, laptop computer, a smart phone, or a tablet.

The host computer 104 can include a device that can allow a viewer computer 102 to access, view, and control the operations of the host computer 104. For example, the viewer computer 102 can include a desktop computer, laptop computer, a smart phone, a tablet, or a server computer.

In some embodiments, the host computer 104 can include an authentication plug-in component installed in a Web browser of the host computer 104. The authentication plug-in can be programmed to create log files, update log files, detect interactions, and send log files. The authentication plug-in can create and update log files on the host computer 104 over time. The authentication plug-in can record all usage patterns, activities, and operations within the operating system of the host computer 104 and one or more applications installed on the host computer 104. The authentication plug-in can update the log file while the viewer computer 102 is controlling the host computer 104 and when the viewer computer 102 is not controlling the host computer 104.

The authentication plug-in can also detect that an interaction is taking place on the browser of the host computer 104 by examining the contents of the webpage. The authentication plug-in can look for indicators (e.g., a captive portal indicator) that indicate that the webpage performs interactions (e.g., is a captive portal). Upon determining that an interaction is taking place, the authentication plug-in of the host computer 104 can send the log file to the authentication server computer 106.

For example, the authentication plug-in can analyze the contents of the webpage for a captive portal. A captive portal can be a webpage or a component of a webpage accessed with a web browser that is displayed to the host computer before the host computer is granted broader access to resources (e.g., logging in, etc.). Captive portals can be used to present a landing or log-in page which may require authentication, payment, acceptance of an end-user license agreement, acceptable use policy, survey completion, or other valid credentials that both the host of the webpage and user of the host computer agree to adhere by.

The authentication plug-in can include a collection of files, packaged for distribution and installation and connection to a browser. A plug-in can include a manifest file that includes metadata such as name, version, permission, pointers, etc. For example, the plug-in can include a JSON manifest file that points to background scripts, icons, sidebars, popups, options pages, content scripts, Web-accessible resources, etc. The authentication plug-in, for example, can include a background script that responds to events that occur in the browser independently of the web page or browser window and determines a captive portal state of the user's connection.

The authentication server computer 106 can include a device that can authenticate interactions and the devices involved in the interactions. The authentication server computer 106 can receive interaction request messages from a host computer 104 during an interaction. The authentication server computer 106 can determine if the interaction associated with the interaction request message is authentic or not authentic. In some embodiments, the authentication server computer 106 can further determine whether or not to authorize the interaction request message based on whether the interaction is authentic or not authentic.

Figure 2:
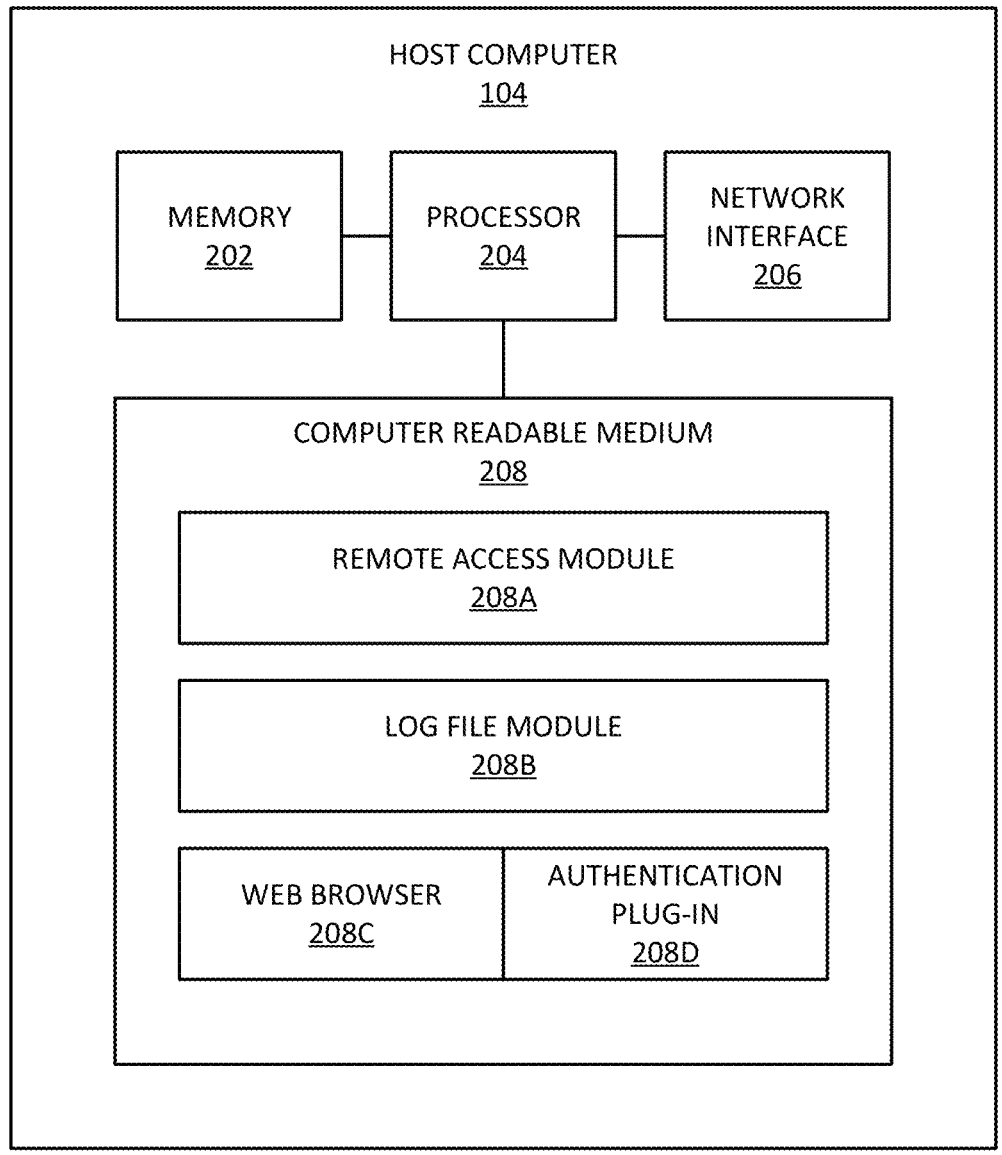
FIG. 2 shows a block diagram of components of a host computer according to embodiments.

FIG. 2 shows a block diagram of a host computer 104 according to embodiments. The exemplary host computer 104 may comprise a processor 204. The processor 204 may be coupled to a memory 202, a network interface 206, and a computer readable medium 208. The computer readable medium 208 can comprise a remote access module 208A and a log file module 208B. The computer readable medium 208 can also include a Web browser 208C and an authentication plug-in 208D.

The memory 202 can be used to store data and code. For example, the memory 202 can store log files. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: creating, by a host computer, a log file containing data used to determine if the host computer is being controlled by a viewer computer; and transmitting, by the host computer, an interaction request message comprising the log file to an authentication server computer, wherein the authentication server computer determines if an interaction associated with the interaction request message is authentic or not authentic.

The remote access module 208A can comprise code or software, executable by the processor 204, for allowing viewer computers to access the host computer 104. The remote access module 208A, in conjunction with the processor 204, can grant or deny access (e.g., set permissions for) to a particular viewer computer. In some embodiments, a user of the host computer 104 can grant or deny access for a viewer computer using the remote access module 208A of the host computer 104.

The remote access module 208A, in conjunction with the processor 204, can receive connection requests from a viewer computer. The remote access module 208A, in conjunction with the processor 204, accept the connection request based on whether or not the viewer computer has been granted access (e.g., has permission to access).

The remote access module 208A, in conjunction with the processor 204, can establish a secure communication channel with the viewer computer, if the connection request is accepted. For example, the remote access module 208A, in conjunction with the processor 204 can initiate the establishment of a TCP/IP communication channel with the viewer computer. As an example, the viewer computer can send control commands (e.g., mouse clicks on buttons, keyboard presses, etc.) over the TCP/IP communication channel to the remote access module 208A of the host computer 104. The remote access module 208A, in conjunction with the processor 204, can send display commands and/or a set of pixels over the TCP/IP communication channel to the viewer computer for the viewer computer to view.

The remote access module 208A, in conjunction with the processor 204, can utilize remote desktop protocols such as Apple Remote Desktop Protocol (ARD), HP Remote Graphics Software (RGS), Independent Computing Architecture (ICA), NX technology (NX), Remote Desktop Protocol (RDP), and/or any other remote access controlling and utilization methods.

The log file module 208B can comprise code or software, executable by the processor 204, for generating log files. The log file module 208B, in conjunction with the processor 204, can generate log files at any point in time. The log file module 208B, in conjunction with the processor 204, can generate log files when a viewer computer is accessing the host computer 104 and when no viewer computer is accessing the host computer 104.

The log file module 208B, in conjunction with the processor 204, can generate log files including a collection of data that contains information about a computer. For example, the log file module 208B, in conjunction with the processor 204, can generate a log file can including data of usage patterns, activities, and operations within an operating system of the host computer 104, an application of the host computer 104, and/or viewer computer. The log file can contain data used to determine if a host computer is being controlled by a viewer computer. The data used to determine if the host computer is being controlled by the viewer computer can include permissions data, input device data, operating system data, and/or communication channel data.

The log file module 208B, in conjunction with the processor 204, can store data regarding usage patterns, activities, and operations as events occur within the host computer 104. In one example, if the host computer 104 is being accessed by a viewer computer and a cursor on the host computer screen moves from screen position (x=100, y=100) to screen position (x=200, y=300), the log file module 208B, in conjunction with the processor 204, can create an entry in the log file that includes a date, a time, an indicator of the type of event (e.g., cursor movement), a host peripheral input (e.g., a touchscreen input, a mouse input, etc.) of null, an indicator that the viewer computer is connected, an indicator that the viewer computer has permissions to access the host computer 104, and/or any other suitable data. Such a log file can contain sufficient information to determine if a viewer computer is controlling the host computer. In this example, the host computer moved the cursor, but the peripheral input is null. Since there is no signal from the peripheral devices in the host computer, this would indicate that the host computer did not move the cursor, but that some other machine is moving the cursor. Also, the indicator that the viewer computer is connected and/or permissions data to access the host computer can also indicate the presence of the viewer computer. This is explained in further detail below.

The Web browser 208C can comprise code or software, executable by the processor 204, for accessing web content. The Web browser 208C, in conjunction with the processor 204, can access web content on web sites hosted by web hosts (e.g., resource providers). When the host computer 104 requests a web page from a particular website, the Web browser 208C, in conjunction with the processor 204, can retrieve the necessary content from a web server and then displays the web page on the hot computer 104. The Web browser 208C can be modified with plug-ins. For example, the Web browser 208C can be modified with an authentication plug-in 208D.

The authentication plug-in 208D can comprise code or software, executable by the processor 204, for performing authentication related functionalities. The authentication plug-in 208D, in conjunction with the processor 204, can create log files, update log files, detect interactions, and send log files. The authentication plug-in 208D, in conjunction with the processor 204, can create and update log files on the host computer 104 over time. The authentication plug-in 208D, in conjunction with the processor 204, can record all usage patterns, activities, and operations within the operating system of the host computer 104 and one or more applications installed on the host computer 104.

The authentication plug-in 208D, in conjunction with the processor 204, can update the log file while the viewer computer 102 is controlling the host computer 104 and when the viewer computer 102 is not controlling the host computer 104. As such, the authentication plug-in 208D, in conjunction with the processor 204, can create a record of what occurs on the host computer 104, as initiated by the host computer 104 and/or the viewer computer 102, leading up to and during an interaction.

The authentication plug-in 208D, in conjunction with the processor 204, can provide the log file to an authentication server computer during an interaction for authentication of the interaction.

The network interface 206 may include an interface that can allow the host computer 104 to communicate with external computers. The network interface 206 may enable the host computer 104 to communicate data to and from another device (e.g., a viewer computer, an authentication server computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
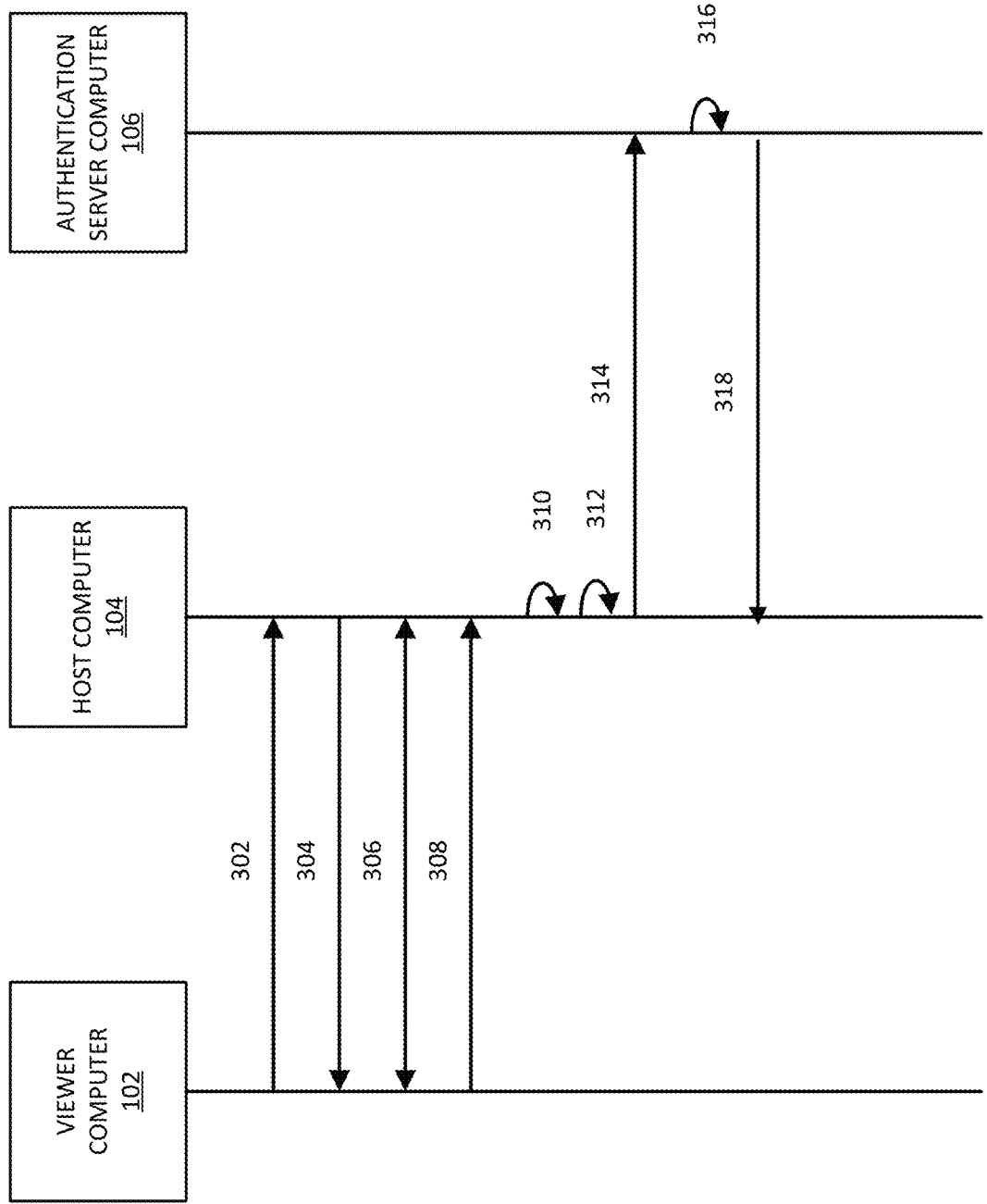
FIG. 3 shows a flow diagram of a verification method according to embodiments.

FIG. 3 shows a flowchart of a verification method according to embodiments. The method illustrated in FIG. 3 will be described in the context of the viewer computer 102 maliciously accessing the host computer 104 to perform a secure webpage access interaction on the host computer 104. It is understood, however, that the invention can be applied to other circumstances (e.g., a non-malicious viewer computer 102, other types of interactions, etc.).

At step 302, the viewer computer 102 can provide a connection request to the host computer 104. The connection request can include a request for the viewer computer 102 to access the host computer 104 (e.g., using a remote desktop protocol).

At step 304, after receiving the connection request, the host computer 104 can generate and provide a connection response to the viewer computer 102. The connection response can indicate if the connection request is granted or denied. The host computer 104 can grant or deny the connection request based on whitelists, blacklists, host computer user created permissions, host computer user inputs, etc.

At step 306, after receiving a connection response that grants the connection request, the viewer computer 102 can access (e.g., take control of) the host computer 104 over a communication channel formed by the host computer 104. The communication channel can be a transmission control protocol/Internet protocol (TCP/IP) communication channel.

At step 308, the viewer computer 102 can send one or more control commands to the host computer 104 through the communication channel. As an illustrative example, the viewer computer 102 can move an input device, such as a mouse that is connected to the viewer computer 102, over a login button displayed on a secure webpage. A username and password may be auto filled in the relevant portions of the webpage by the host computer's browser. A malicious entity operating the viewer computer 102 can attempt to perform a fraudulent login to a secure webpage using the host computer 104. The viewer computer 102 can send the control command to click on the login button to the host computer 104 over the remote access communication channel.

At step 310, after receiving the one or more control commands, the host computer 104 can generate and/or update a log file. The host computer 104 can generate and/or update the log file based on the one or more control commands. The host computer 104 can create the log file containing data used to determine if the host computer 104 is being controlled by a viewer computer 102. The data used to determine if the host computer 104 is being controlled by the viewer computer 102 includes permissions data, input device data, operating system data, and/or communication channel data.

For example, the host computer 104 can receive a control command that initiates transmitting of an interaction request message to the authentication server computer 106. The host computer 104 can include the control command that initiates transmitting of the interaction request message in the log file.

As an additional example, the host computer 104 can further generate and/or update a log file with permissions data, input device data, operating system data, and/or communication channel data. For example, the log file can include the following data obtained from the viewer computer 102: a remote access software version number, a screen resolution, a screen color depth, keyboard information, a host name, a communication channel encryption method, sizes of communication channel cryptographic session keys, a viewer computer certificate, a number of requested and allocated virtual channels, etc.

In some embodiments, the log file can be generated and/or updated by an authentication plug-in component installed in a Web browser of the host computer 104. The authentication plug-in can be configured to create log files, update log files, detect interactions, and send log files. For example, after executing a control command, the host computer 104 can notify the authentication plug-in of the control command. The authentication plug-in can generate the log file on the host computer 104 including the control command.

As an illustrative example, the malicious entity operating the viewer computer 102 may have sent a control command to click on the login button to the host computer 104. The host computer 104 can update a log file to include at least the control command. For example, the host computer 104 can create an entry in the log file that includes an indication that the host computer 104 is connected to a viewer computer 102 via a communication channel. The entry in the log file can also include a date, a time, the click on the login button, and/or any other data the represents the state of the host computer 104 and/or the connection to the viewer computer 102.

In some embodiments, the host computer 104 can update the log file with additional data used to determine if the host computer 104 is being controlled by the viewer computer 102. For example, the host computer 104 can generate the log file when receiving a first control command from the viewer computer 102. When the host computer 104 receives additional control commands from the viewer computer 102, the host computer 104 can include additional data used to determine if the host computer 104 is being controlled by the viewer computer 102 based on the additional control commands.

At step 312, after generating or updating the log file, the host computer 104 can execute the one or more control commands. The host computer 104 can perform actions as indicated by the one or more control commands. In some cases, the one or more control commands can result in the host computer 104 initiating an interaction with the authentication server computer 106.

As an illustrative example, the host computer 104, which is being remotely controlled by the viewer computer 102, can execute the click command. As such, the host computer 104 can initiate a click on the login button on the secure webpage. By clicking on the login button on the secure webpage, the host computer 104 can initiate an interaction. To perform the indication, the host computer 104 can generate an interaction request message. The interaction request message can include data that allows the host computer 104 to perform the interaction and, in some embodiments, data that allows an authorizing entity computer to determine whether or not to authorize the interaction. For example, the host computer 104 can generate the interaction request message comprising the username and the password to access the secure webpage.

The interaction request message can further include the log file that is maintained by the host computer 104. In some embodiments, an authentication plug-in can inject the log file into the interaction request message. In other embodiments, the authentication plug-in can provide a message including the log file to the authentication server computer 106 separately from the interaction request message.

At step 314, due to the one or more control commands, the host computer 104 can transmit the interaction request message comprising the log file to the authentication server computer 106.

In some embodiments, if the log file is maintained by the authentication plug-in installed in the browser of the host computer 104, then the authentication plug-in can provide the log file to the authentication server computer 106 during the interaction. For example, the authentication plug-in can detect that an interaction is taking place through examining the contents of the webpage for indicators (e.g., a captive portal indicator) that indicate that the webpage performs interactions (e.g., is a captive portal). Upon determining that an interaction is taking place, the authentication plug-in of the host computer 104 can send the log file to the authentication server computer 106.

At step 316, after receiving the interaction request message, the authentication server computer 106 can determine if the interaction associated with the interaction request message is authentic or not authentic. The authentication server computer 106 can determine that the interaction request message is authentic or not authentic based on at least the log file. The authentication server computer 106 can determine that the interaction request message is authentic or not authentic based on at least the viewer computer's initiation of the interaction, as indicated by the log file.

As an illustrative example, the authentication server computer 106 can analyze the log file to determine that the host computer 104 was connected to the viewer computer 102 during the interaction. The authentication server computer 106 can further determine that the host computer 104 received a control command from the viewer computer 102 that resulted in the host computer 104 clicking on the login button to access the secure webpage. The authentication server computer 106 can determine that the interaction is not authentic based on the log file that indicates that the viewer computer 102 initiated the interaction on the host computer 104.

In this example, the viewer computer 102 was operated by a malicious entity to perform the interaction on the host computer 104. However, it is understood that the viewer computer 102 may be operated by an honest entity to perform the interaction on the host computer 104. For example, a user can own and use both the viewer computer 102 (e.g., a laptop computer) and the host computer 104 (e.g., a desktop computer). The user can utilize the viewer computer 102 while on vacation to access the host computer 104 at their home to perform a transaction. In such a case, the authentication server computer 106, while analyzing the log file, can determine that the host computer 104 has performed nine successful transactions in the past that were initiated by the viewer computer 102 using device fingerprinting that combines certain attributes of the viewer computer 102 (e.g., what operating system it is on, the type and version of web browser being used, the browser's language setting and the device's IP address, etc.) to identify it as a unique viewer computer 102. The authentication server computer 106, while analyzing the log file, can further determine that the host computer 104 commonly connects to the IP address of the viewer computer 102. Due to the analysis of the log file, the authentication server computer 106 can determine that the transaction is authentic.

In some embodiments, after determining if the interaction is authentic or not authentic, the authentication server computer 106 can generate an interaction response message that indicates whether or not the interaction is authentic. In some cases, the authentication server computer 106 can provide the interaction response message to the host computer 104. In other cases, the authentication server computer 106 can provide the interaction response message to an authorizing entity computer that can determining whether or not to authorize the interaction based on at least the determination of whether or not the interaction is authentic.

As another example, the authentication server computer 106 can receive the log file from the host computer 104 in step 318. The log file can include five entries that were created by the authentication plug-in prior to the interaction being initiated. Each entry in the log file can include permissions data, control commands, and communication channel data. For example, each entry in the log file can include permissions data that includes a device identifier of the viewer computer 102 and indicates that the viewer computer 102 has permission to send control commands to the host computer 104.

The first of the five entries in the log file can include no control commands and can indicate that no communication channels are formed. The second entry in the log file can include no control commands and can indicate that a communication channel was formed with the viewer computer 102. The third entry in the log file can include a control command from the viewer computer 102 that commands the host computer 104 to open a bank web page. The third entry can also include the communication channel data for the communication channel between the viewer computer 102 and the host computer 104. The fourth entry in the log file can include the communication channel data and a control command that commands the host computer 102 to autofill the username and password fields on the bank web page. The fifth entry in the log file can include the communication channel data and a control command that commands the host computer 102 to initiate a secure web page interaction to access the bank web page (e.g., a command to click on a login button on the web page).

The authentication server computer 106 can analyze the log file to determine that the host computer 104 is being controlled by the viewer computer 102 and that at least one of the control commands is a control command to autofill the username and password fields. The authentication server computer 106 can determine that the interaction is not authentic due to the presence of the autofill command. The authentication server computer 106 can require that interactions that are initiated by a viewer computer include usernames and passwords that are manually typed out rather than autofilled.

As another example, the authentication server computer 106 can receive the log file from the host computer 104. The log file can include entries that were created by the authentication plug-in prior to the interaction being initiated. Each of the three entries can indicate that no viewer computer was connected to the host computer 104. For example, the communication channel formed for allowing the host computer 104 to communicate with the viewer computer can be formed over the TCP port 3389 (e.g., as utilized in RDP). The log file can include entries that each indicate that TCP port 3389 was not in use. The authentication server computer 106 can analyze the log file to determine whether the interaction is authentic or not authentic. In this example, the authentication server computer 106 can determine that the interaction is authentic because the TCP port 3389 was not in use leading up to the initiation of the interaction, and thus the host computer 104 was not in communication with a viewer computer 102.

Figure 4:
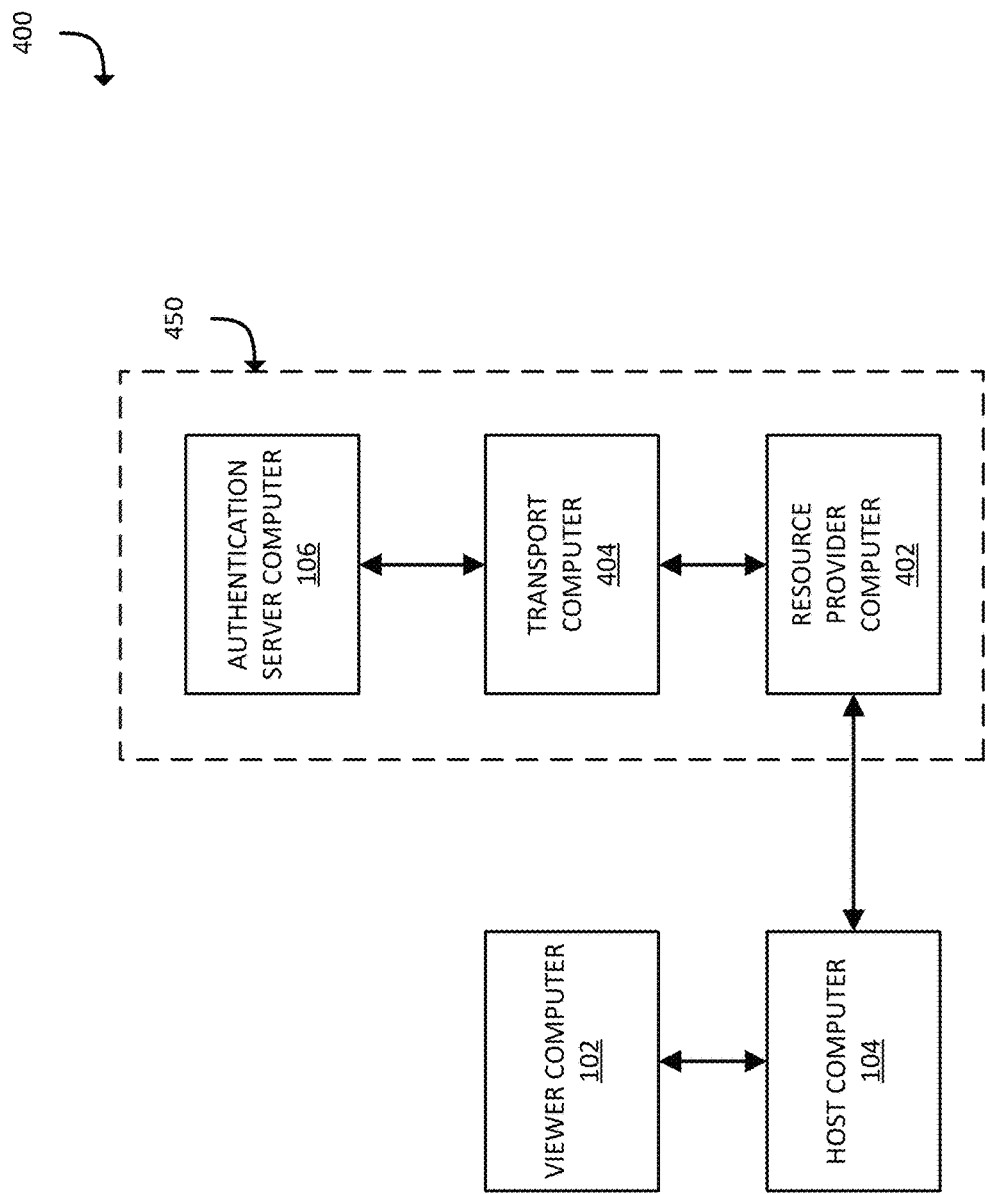
FIG. 4 shows a block diagram of an interaction authorization system according to embodiments.

FIG. 4 shows a system 400 according to embodiments of the disclosure. The system 400 comprises the viewer computer 102, the host computer 104, the authentication server computer 106, a resource provider computer 402, and a transport computer 404. The system 400 also includes a processing system 450 that includes the authentication server computer 106, the resource provider computer 402, and the transport computer 404. The viewer computer 102 can be in operative communication with the host computer 104, which can be in operative communication with the resource provider computer 402. The transport computer 404 can be in operative communication with the resource provider computer 402 and the authentication server computer 106.

The processing system 450 can include a plurality of computers. The processing system 450 can route and process authorization request messages. The processing system 450 can be an interaction authorization processing system (e.g., a transaction authorization processing system).

The resource provider computer 402 may be associated with a resource provider. The resource provider may engage in transactions, sell goods or services, or provide access to goods or services to the user of the viewer computer 102 and/or the host computer 104. The resource provider may accept multiple forms of payment and may use multiple tools to conduct different types of transactions. The resource provider may sell goods and/or services via a website hosted by the resource provider computer 402, and may accept payments and process refunds over the Internet. In some embodiments, resource providers may also include entities that provide access to data or physical spaces, such as governmental agencies, secure data servers, access-limited doors and portals, etc.

The transport computer 404 can include a computer capable of routing messages in the processing system 450. The transport computer 404 may be associated with the resource provider computer 402, and may manage authorization requests as well as transaction reversals on behalf of the resource provider computer 402. In some embodiments, the transport computer 404 may also store transaction records where the transactions are identified by transactions information (e.g., a resource provider identifier, a transaction identifier, and/or a timestamp).

In some embodiments, the processing system 450 can further include an authorization entity computer (not shown). The authorization entity computer can be in operative communication with the authentication server computer 106. The authorization entity computer can determine whether or not to authorize interactions processed by the processing system 450. In other embodiments, the authentication server computer 106 can be an authorization entity computer.

As an example, when the viewer computer 102 sends a control command to the host computer 104 that causes the host computer 104 to initiate an interaction (e.g., at step 308 as illustrated in FIG. 3). The interaction can be a transaction. The host computer 104 can generate an interaction request message that is an authorization request message. The authorization request message can include transaction data (e.g., one or more resources, a date, a time, a credential, an amount, etc.). In some embodiments, the authorization request message can include the log file. In other embodiments, the host computer 104 can send the log file, along with an identifier that links the log file to the authorization request message, directly to the authentication server computer 106.

The host computer 104 can send the authorization request message to the resource provider computer 402. The resource provider computer 402, upon receiving the authorization request message, can send the authorization request message to the transport computer 404. The transport computer 404 can send the authorization request message to the authentication server computer 106.

In some cases, the authentication server computer 106 can receive the authorization request message that comprises the transaction data and the log file. In other cases, the authentication server computer 106 can receive the authorization request message that comprises the transaction data from the transport computer 404 and receive the log file from the host computer 104.

The authentication server computer 106 can determine if the transaction is authentic or not authentic based on the log file. In some embodiments, the authentication server computer 106 can determine whether or not to authorize the transaction. The authentication server computer 106 can generate an authorization response message comprising an indication of whether or not the transaction is authorized. In other embodiments, the authentication server computer 106, if the transaction is authentic, can send the authorization request message to an authorizing entity computer (not shown). The authorizing entity computer can determine whether or not to authorize the transaction and can generate an authorization response message comprising an indication of whether or not the transaction is authorized. The authorizing entity computer can provide the authorization response message to the authentication server computer 106.

After receiving or generating the authorization response message, the authentication server computer 106 can provide the authorization response message to the transport computer 404. The transport computer 404 can provide the authorization response message to the resource provider computer 402.

The resource provider computer 402 can provide the authorization response message to the host computer 104. The resource provider computer 402 can complete the transaction (e.g., by providing the resources to the host computer 104).

If the authorization request message is for a payment transaction, then a clearing and settlement process can occur between the entity operating the resource provider computer and the entity that operates the authentication server computer 106 or a downstream authorizing entity computer (not shown in FIG. 4).

Embodiments of the disclosure have several technical advantages. For example, embodiments can detect and stop malicious interactions that are initiated by a viewer computer that is accessing a host computer to perform the interaction. As such, embodiments provide for technical safeguards to accidentally, or through malicious actions, providing remote access permissions to a malicious viewer computer.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   creating, by an authentication plug-in operating in a browser of a host computer, a log file to record data used to determine if the host computer is being controlled by a viewer computer;
   monitoring, by the authentication plug-in, events for a webpage of a website, the webpage being accessed on the host computer via the browser by the viewer computer, wherein the events relate to at least changes in contents of the webpage, and the monitoring comprises:
      analyzing the contents of the webpage to determine the events for the webpage,
      recording, to the log file, the data related to the events for the webpage, and
      based on the analyzing, determining that one of the events corresponds to a particular interaction taking place; and
   in response to the particular interaction taking place, transmitting, by the host computer, an interaction request message comprising the log file to an authentication server computer, wherein the authentication server computer determines if the particular interaction associated with the interaction request message is authentic or not authentic by analyzing the data in the log file that indicates that the viewer computer initiated the particular interaction on the host computer.

2. The method of claim 1, wherein the interaction request message is an authorization request message.

3. The method of claim 1, wherein the authentication server computer is part of a processing system that routes and processes authorization request messages.

4. The method of claim 1, wherein the data used to determine if the host computer is being controlled by the viewer computer includes permissions data, input device data, operating system data, and/or communication channel data.

5. The method of claim 4, wherein the data used to determine if the host computer is being controlled by the viewer computer comprises the input device data, and the input device data includes keyboard data, mouse data, and/or touchscreen data.

6. The method of claim 1 further comprising:
forming, by the host computer, a communication channel with the viewer computer; and
receiving, by the host computer, one or more control commands from the viewer computer through the communication channel.

7. The method of claim 1 further comprising:
updating, by the host computer, the log file with additional data used to determine if the host computer is being controlled by the viewer computer.

8. The method of claim 1 further comprising:
receiving, by the host computer from the viewer computer, a control command that initiates transmitting of the interaction request message to the authentication server computer, wherein the log file includes the control command, and wherein the authentication server computer also determines if the interaction request message is authentic or not authentic based on at least the control command.

9. The method of claim 1, wherein transmitting the interaction request message to the authentication server computer further comprises:
transmitting, by the host computer, the interaction request message to the authentication server computer via a resource provider computer and a transport computer.

10. The method of claim 9, wherein the authentication server computer determines whether or not to authorize the particular interaction after determining if the interaction request message is authentic or not authentic.

11. The method of claim 1, wherein the determining if the particular interaction associated with the interaction request message is authentic or not authentic further comprises analyzing a viewer computer fingerprint associated with the data in the log file.

12. A host computer comprising:
a processor; and
a computer-readable medium coupled to the processor, the computer-readable medium comprising code that, when executed by the processor, causes the processor to perform a method including:
creating, by an authentication plug-in operating in a browser of the host computer, a log file to record data used to determine if the host computer is being controlled by a viewer computer;
monitoring, by the authentication plug-in, events for a webpage of a website, the webpage being accessed on the host computer via the browser by the viewer computer, wherein the events relate to at least changes in contents of the webpage, and the monitoring includes:
analyzing the contents of the webpage to determine the events for the webpage,
recording, to the log file, the data related to the events for the webpage, and
based on the analyzing, determining that one of the events corresponds to a particular interaction taking place; and
in response to the particular interaction taking place, transmitting an interaction request message comprising the log file to an authentication server computer, wherein the authentication server computer determines if the particular interaction associated with the interaction request message is authentic or not authentic by analyzing the data in the log file that indicates that the viewer computer initiated the particular interaction on the host computer.

13. The host computer of claim 12, wherein the method further includes:
receiving one or more control commands from the viewer computer.

14. The host computer of claim 13, wherein creating the log file further includes:
adding the one or more control commands to the log file.

15. The host computer of claim 13, wherein the method further includes:
executing the one or more control commands.

16. The host computer of claim 12, wherein the method further includes:
receiving, from the viewer computer, a control command that initiates transmitting of the interaction request message to the authentication server computer, wherein the log file includes the control command, and wherein the authentication server computer also determines if the interaction request message is authentic or not authentic based on the control command.

17. A method comprising:
receiving, by an authentication server computer from a host computer that has determined that a particular interaction is taking place, an interaction request message comprising a log file, wherein the log file has been created by an authentication plug-in operating in a browser of the host computer to record data used to determine if the host computer is being controlled by a viewer computer by analyzing contents of a webpage of a website to determine events for the webpage, the webpage being accessed on the host computer via the browser by the viewer computer, recording, to the log file, the data related to the events for the webpage, and based on the analyzing, determining that one of the events corresponds to the particular interaction taking place; and
determining, by the authentication server computer, if the particular interaction associated with the interaction request message is authentic or not authentic by analyzing the data in the log file that indicates that the viewer computer initiated the particular interaction on the host computer.

18. The method of claim 17, wherein the data used to determine if the host computer is being controlled by the viewer computer includes permissions data, input device data, operating system data, and/or communication channel data, wherein the input device data includes keyboard data, mouse data, and/or touchscreen data.

19. The method of claim 17, wherein the interaction request message is an authorization request message, wherein the authentication server computer is part of a processing system that routes and processes authorization request messages.

20. The method of claim 17, wherein the determining if the particular interaction associated with the interaction request message is authentic or not authentic further comprises analyzing a viewer computer fingerprint associated with the data in the log file.

* * * * *